Patented Feb. 9, 1954

2,668,797

UNITED STATES PATENT OFFICE 2,668,797

STABLE ANTHRONE

Lawrence R. Jones, Terre Haute, Ind., and
Peter C. Markunas, Winston-Salem, N. C.

No Drawing. Application October 20, 1951,
Serial No. 252,414

7 Claims. (Cl. 252—408)

Our invention relates to the analytical reagent 9,10-dihydro-9-ketoanthracene and more particularly it relates to preparations of this reagent which are stable for considerable periods of time.

The compound 9,10-dihydro-9-ketoanthracene, more commonly known as anthrone, is a recognized analytical reagent for the qualitative and quantitative analysis of carbohydrates. The compound can be prepared according to the method disclosed in Organic Syntheses, collective volume 1, page 60. The reagent solution most commonly used in the art consists of solutions of anthrone in 95% sulfuric acid at concentrations ranging from 0.05% to 0.2%. The use of such solutions in the analysis of carbohydrates is described by Morris, Science, 107, 254; Viles and Silverman, Analytical Chemistry, 21, 950; and Durham, U. S. Public Health Reports, 65, 670.

It was discovered soon after the use of anthrone was proposed for analyzing carbohydrates that the reagent solution was not stable for more than about 4 to 6 days, and the writers referred to above cautioned against its use for periods in excess of these limits. The instability of the reagent solution is apparent even though it is kept refrigerated from the time it is made. Because of this instability, analysts have had to run a known carbohydrate standard with each unknown being analyzed and the inconvenience and expense of such a practice is plainly apparent.

We have now discovered an anthrone reagent solution which is stable for periods in excess of 30 days thus greatly facilitating the qualitative and quantitative analysis of carbohydrates as well as rendering such analysis more economical from the standpoint of material employed and time consumed.

Our new composition consists in general of a glacial acetic acid solution of anthrone to which has been added a compound containing a sulfite radical, the said compound being soluble in the acetic acid solution of anthrone. We have discovered also that the same effect is obtained when sulfur dioxide is added to the acetic acid solution of anthrone, and consequently we intend for this compound to be included in the term sulfite carrier.

As sulfite-containing compounds in the composition of our invention, we can use alkali metal sulfite compounds and alkaline earth metal sulfite compounds. Examples of operative sulfite-containing compounds are sodium sulfite, sodium bisulfite, sodium hydrosulfite, sodium hyposulfite, sodium meta bisulfite, potassium sulfite, potassium bisulfite, potassium hyposulfite, potassium meta bisulfite, calcium sulfite, calcium bisulfite, barium sulfite, magnesium hyposulfite, ammonium sulfite, ammonium bisulfite, etc. In addition, organic sulfites and bisulfites such as for example primary, secondary, and tertiary amine sulfites and bisulfites can be employed. For purposes of this invention we intend for the term alkali metal to include therein the ammonium radical. In general, any compound capable of liberating the sulfite radical which is soluble in the acetic acid solution of anthrone and which is otherwise inert or which does not inhibit the analytical properties of the reagent solution is operative in our invention and we intend for such compounds in general to be included within the scope of our invention as defined in this specification and the attached claims. Of the above-mentioned compounds we prefer to employ the alkali metal sulfites and in particular potassium sulfite because of its low cost and ready availability.

The amount of sulfite carrier which we can employ varies with the concentration of the anthrone in the acetic acid solution. The minimum amount is limited by the stability desired, some stabiltiy being attained with the addition of comparatively small amounts of the sulfite carrier. The maximum amount is limited only by the solubility of the sulfite carrier in the acetic acid solution of anthrone, however there is, of course, a practical limit. We prefer to employ the sulfite carrier in a weight ratio of carrier to anthrone ranging from about 1 to 3 to about 7 to 1 and we have found that a ratio of about 1 to 1 gives outstanding results.

Our new anthrone reagent can be compounded in any convenient manner such as by dissolving the anthrone and sulfite carrier in the glacial acetic acid separately or the anthrone and sulfite carrier can be mixed and then the mixture dissolved in the acid. Furthermore the reagent may be stabilized by passing sulfur dioxide into an acetic acid solution of anthrone.

The following examples are offered for illustrative purposes only and we do not intend to be limited to the specific materials, amounts or proportions specified therein.

*Example I*

A 4.2 gram portion of anthrone crystals having a melting point of at least 155° C. was dissolved in 2 liters of glacial acetic acid. To this solution was added with mixing 25 grams of anhydrous potassium sulfite crystals. The resulting solution was allowed to stand for about 24 hours before it was used in the analysis of carbohydrates. The reagent solution was still stable 30 days after it was prepared.

Example II

An acetic acid solution of anthrone was prepared as in Example I and the solution then saturated with sulfur dioxide. After standing for about 24 hours, the solution was used in the analysis of carbohydrates and it was still stable and useful as an analytical reagent 30 days following its preparation.

Example III

A 3 gram portion of anthrone crystals was dissolved in 2 liters of glacial acetic acid. To this was added with mixing 3 grams of calcium bisulfite. The resulting solution was allowed to stand for about 24 hours and then used in the analysis of carbohydrates. The reagent solution was still stable 30 days after it was prepared.

What we claim is:

1. A glacial acetic acid solution of anthrone and a sulfite-containing compond.
2. A glacial acetic acid solution of anthrone stabilized by the addition of a compound selected from the group consisting of sulfur dioxide, alkali metal sulfites, alkali metal bisulfites, alkaline earth metal sulfites and alkaline earth metal bisulfites.
3. A stable anthrone solution which comprises a glacial acetic acid solution of anthrone and potassium sulfite.
4. A stable anthrone reagent which comprises a glacial acetic acid solution of anthrone and potassium bisulfite.
5. A stable anthrone reagent which comprises a glacial acetic acid solution of anthrone and sodium sulfite.
6. A stable anthrone reagent which comprises a glacial acetic acid solution of anthrone and sodium bisulfite.
7. A stable anthrone reagent which comprises a glacial acetic acid solution of anthrone and sulfur dioxide.

LAWRENCE R. JONES.
PETER C. MARKUNAS.

References Cited in the file of this patent

UNITED STATES PATENTS

| Number | Name | Date |
| --- | --- | --- |
| 1,935,928 | Zahn et al. | Nov. 21, 1933 |
| 2,205,191 | Flaks | June 18, 1940 |